United States Patent Office 3,646,065
Patented Feb. 29, 1972

3,646,065
16-OXA STEROIDS
Richard Wightman Kierstead, North Caldwell, N.J., assignor to Hoffmann-La Roche Inc., Nutley, N.J.
No Drawing. Original application Nov. 15, 1965, Ser. No. 496,649, now Patent No. 3,448,123, dated June 23, 1969. Divided and this application Feb. 17, 1969, Ser. No. 799,924
Int. Cl. C07d 5/04
U.S. Cl. 260—340.9                                           1 Claim

ABSTRACT OF THE DISCLOSURE

This invention relates to 17-hydroxy-16-oxa-androstan-3-ones, intermediates therefor and processes for making the same. These compounds can be prepared from the corresponding D-ring lactones wherein the 3-carbonyl substituent is protected, i.e., 16-oxa-androstan-17-ones. The subject compounds are pharmaceutically useful as anti-androgens.

RELATED APPLICATIONS

This application is a division of applicant's copending application Ser. No. 496,649, filed Nov. 15, 1965, now U.S. Pat. 3,448,123.

DETAILED DESCRIPTION

This invention relates to a novel class of endrocrinologically active compounds, intermediates therefor and processes of making the same. The endrocrinologically active compounds of this invention are steroids containing a 5-membered heterocyclic ring. More particularly, they are 16-oxasteroids of the formula

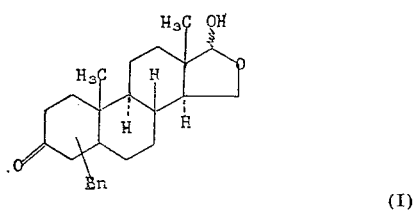

(I)

wherein B is an olefinic unsaturation between carbon atoms 4 and 5 and $n$ is a whole integer from 0–1. As is apparent from Formula I above, the endrocrinologically active end products of this invention are 17-hydroxy-16-oxa-androstan-3-ones. These compounds can be prepared from corresponding D-ring lactones wherein the 3-carbonyl substituent is protected, i.e. 16-oxa-androstan-17-ones, which are themselves novel compounds and a part of this invention. More particularly, said 16-oxa-androstan-17-ones can be reduced to yield the 17-hydroxy compounds of Formula I. For example, reduction of the D-ring lactone structure with an alkali metal aluminum hydride, such as lithium aluminum hydride and sodium aluminum hydride, has been found effective. This reduction can be effected at a temperature from about −40° C. and about −70° C., preferably about −70° C. The reduction can also be effected utilizing as the reducing agent a di-lower alkyl aluminum hydride, such as diisobutyl aluminum hydride, or an alkali metal tri-lower alkoxy aluminum hydride, such as lithium tri-t-butoxyaluminumhydride. Using these reducing agents, the reduction can be effected in the same temperature range as when an alkali metal aluminum hydride is utilized. When the 16-oxa-androstan-17-one being reduced has an olefinic unsaturation in its structure, the use of one of the aforementioned reducing agents is preferred. However, when the 16-oxaandrostan-17-one being reduced is fully saturated, it is suitable to use a di-lower alkyl borane such as bis (3-methyl-2-butyl) borane (i.e. disiamylboran). When using such a borane reducing agent, it is suitable to effect a reduction at a temperature between 0° C. and about 30° C., preferably about 25° C., i.e., it is most convenient to operate at room temperature. It has been found, especially preferable, after treating with the borane reducing agent, to treat the reaction mixture with water and then to treat the crude reaction product over silicic acid, for example, by passing over a column of silicic acid. The above described reductions can be suitably effected in an inert organic solvent which is in a liquid state at the temperature at which the reduction is effected, for example, an aromatic hydrocarbon such as benzene, toluene, or xylene; an ether such as ethyl ether or tetrahydrofuran; benzene, for example, freezes at 5.5° C. and, thus, cannot be used in the above-described reduction which are effected at a lower temperature.

In conducting the above described reductions, it is suitable prior to the reduction to protect the carbonyl group present in the 3-position of the 16-oxaandrostan-17-one starting material. Thus the compounds suitably subjected to the above described reductions which yield the endrocrinologically end products of Formula I are 16-oxaandrostan-17-ones of the formula

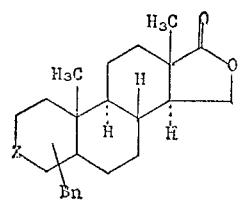

(II)

wherein B and $n$ have the same meaning as above and Z is a protected carbonyl moiety. The carbonyl moiety can preferably be protected by, for example, reaction with a lower alkylene glycol such as ethylene glycol, in which event Z represents a lower alkylenedioxy-methylene moiety such as ethylenedioxy-methylene. Other conventional protecting means can also be used. For example, a di-lower alkyl ketal can be formed by reaction of the 3-carbonyl moiety starting material with, for example, a lower alkanol such as ethanol in the presence of a mineral acid such as hydrochloric acid or an organic acid such as para-toluenesulfonic acid.

Following the above described reduction there is obtained a compound of the formula

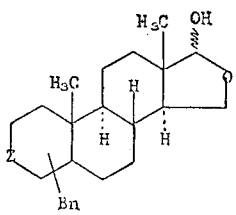

(III)

wherein B, $n$ and Z have the same meaning as above. The protecting group in the compound of Formula III can be removed in order to generate the 3-oxo compounds of Formula I according to methods known per se. For example, acid hydrolysis of the lower alkylenedioxy moiety yields the carbonyl moiety of the compounds of Formula I.

The compounds of Formula II, which are novel compounds and a part of this invention, can be prepared from compounds of formula

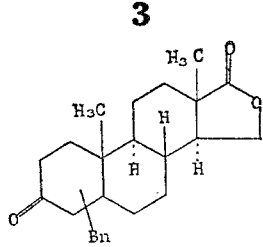

(IV)

wherein B and $n$ have the same meaning as above by means known per se, for example, as indicated above, by reaction with lower alkylene glycol to form a 3-lower alkylenedioxy compound. The compounds of Formula IV, which are also novel compounds within the scope of this invention, can be prepared via oxidation of 3-hydroxy-16-oxaandrostan-17-ones. Thus where $n$ is 0, the compound of Formula IV can be prepared via oxidation of 3-hydroxy-16-oxaandrostan-17-one per se. Whereas when $n$ is one, the compound of Formula IV can be prepared via oxidation of 3 - hydroxy-16-oxaandrost-5-en-17-one. The aforesaid oxidations can be effected according to means known per se, for example, via the use of a chromic acid oxidizing reagent, such as chromic acid/pyridine or chromic acid/acetone/sulfuric acid. When a $\Delta^5$ starting material is used, it is suitable, after the oxidation, to treat with a mineral acid such as sulfuric acid to insure rearrangement of the $\Delta^5$-double bond to the $\Delta^4$-double bond. Also, when a $\Delta^5$ starting material is used the oxidation can be effected by the Oppenaver oxidation [Rec. trav. chim. 56, 137 (1937)].

The starting material 3 - hydroxy-16-oxaandrostan-17-ones are themselves novel materials within the scope of this invention. They can be formed by a lactonization to form the D-ring of the steroid moiety containing a 16-oxa moiety. The starting materials for this lactonization are themselves novel compounds within the scope of this invention. They are of the formula

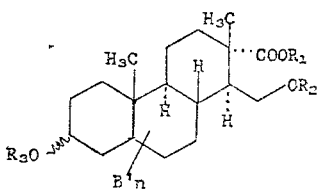

(V)

wherein $R_1$ is hydrogen or lower alkyl; each of $R_2$ and $R_3$ is, independently, hydrogen or lower alkanoyl; B' is an olefinic double bond between carbon atoms 8a and 9 of the phenanthrene nucleus and $n$ is a whole integer from 0 to 1.

The lactonization is actually effected on hydroxy acids, i.e., compounds of Formula V wherein both $R_1$ and $R_2$ are hydrogen. The lactonization can be effected by heating the hydroxy acid of Formula V. Suitably the hydroxy acid is heated to reflux in an organic solvent, for example, an anhydride such as acetic anhydride, a lower alkanol such as methanol or ethanol, an ether such as tetahydrofuran, an aromatic hydrocarbon such as benzene, toluene or xylene, or the like. When a solvent other than an anhydride is used, it is preferable to conduct the heating in the presence of an acid, i.e., at pH less than 7. Thus, if an aromatic hydrocarbon solvent is used it is suitable to add p-toluenesulfonic acid to the lactonization medium. Other suitable acids are mineral acids such as hydrobromic acid, hydrochloric acid, sulfuric acid, phosphoric acid or the like. Alcoholic hydrohalic acid is a preferred lactonization medium. If the lactonization is effected in the presence of a mineral acid, it can be effected at room temperature, but heating accelerates the cyclization. Thus, the lactonization can be effected at a temperature between about room temperature and the reflux temperature of the reaction medium.

If the lactonization is effected with a compound of Formula V wherein $R_3$ is lower alkanoyl or in the presence of a medium which effects esterification such as a lower alkanoyl anhydride, the resulting 3-lower alkanoyloxy-16-oxaandrostan-17-one can be subjected to basic hydrolysis, with, for example, an alkali metal hydroxide such as potassium hydroxide, and recyclization with, for example, lower alkanolic hydrochloric acid to yied the compound corresponding to those of Formula IV, except that wherein the compounds of Formula IV contains a 3-oxo-substituent, the presently obtained compounds will contain a 3-hydroxy substituent. These 3-hydroxy-16-oxaandrostan-17-ones can be converted to the corresponding 3,17-diones by oxidation.

The hydroxy acids (i.e., $R_1$ and $R_2$ are both hydrogen) of Formula V can be obtained from compounds of Formula V where either or both of $R_1$ and $R_2$ are other than hydrogen. These latter compounds are esters which can be directly hydrolyzed to the hydroxy acid lactonization precursors by means known per se, i.e., by basic hydrolysis, for example, by hydrolysis with an alkali metal hydroxide such as potassium hydroxide or sodium hydroxide, or the like. The esters can also be hydrolyzed by acid hydrolysis, for example, by treatment with a mineral acid, such as hydrochloric acid, hydrobromic acid, sulfuric acid, phosphoric acid, or the like, in which case hydrolysis and lactonization are simultaneously effected.

In a separate embodiment the hydroxy acid compounds of Formula V can be obtained from 1-acetonyl-phenanthrenes of the formula

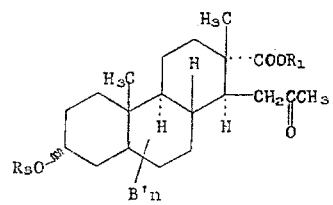

(VI)

wherein $R_1$, $R_3$ and B' and $n$ have the same meaning as above. The 1-acetonyl-phenanthrene compounds of Formula VI are a part of this invention and can be converted to the hydroxy acids or esters thereof by several means; for example, oxidation of a compound of Formula VI with a peracid such as Caro's acid, peracetic acid or peroxytrifluoroacetic acid yields a hydroxy acid of Formula V followed by alkaline hydrolysis of the so-obtained acetate of a 1-hydroxymethyl-phenanthrene. If, in the starting material of Formula VI $R_1$ and $R_3$ represent lower alkyl or lower alkanoyl, respectively, these moieties will be split off during the alkanine hydrolysis and the so-obtained 7-hydroxy-1-hydroxymethyl - 2 - phenanthrenecarboxylic acid of Formula V is one in which both $R_1$ and $R_3$, as well as $R_2$, are hydrogen, i.e., a hydroxy acid lactonization precursor. By a different method particularly suitable for use with those compounds of Formula VI wherein $n$ is one, compounds of Formula VI are halogenated to yield a corresponding 8a,9-dihalo-phenanthrene such as an 8a,9-dibromo or 8a,9-dichloro-phenanthrene, which is then subjected to the oxidation with the peracid whereby a 1-hydroxymethylphenanthrene corresponding to those of Formula V but bearing halo substituents in the 8a and 9 positions is obtained. The unsaturation between the 8a and 9 carbon atoms is then regenerated by dehalogenation, for example, by a treatment with zinc dust in acetic acid.

The starting material 2-(carbo-lower alkoxy)-phenanthrene esters of Formula V and 1-acetonyl compounds of Formula VI can themselves be prepared by a variety of methods. The common starting material for the preparation of these compounds of Formulas V and VI is a dodecahydro-7-hydroxy-2,4b-dimethyl - 1 - phenanthreneacetic acid. In one emodiment, this starting material is hydrogenated and the so-formed perhydro compound is acylated to yield the corresponding 7-lower alkanoyloxy compound. These 7-hydroxy and lower alkanoyloxy-tetradecahydro - 2 - (carbo-lower alkoxy) - 2,4b - dimethyl-1-phenanthreneacetic acids can alternatively be designated as 3β-hydroxy and lower alkanoyloxy-16,17-secoandrostane-16,17-dioic acid esters. Treatment of the so-formed tetradecahydro-phenanthreneacetic acids to form the silver salt thereof, followed by reaction with bromine, yields corresponding 1-bromomethyl-phenanthrenes, which are part of this invention and which upon treatment with an alkali metal salt of a lower alkanoic acid yield a compound of Formula V wherein $R_2$ is lower alkanoyl.

The 1-acetonyl compound of Formula VI can be prepared from the starting material 2-(carbo-lower alkoxyl)-1,2,3,4,4a,4b,5,6,7,8,10,10a - dodecahydro - 7 - hydroxy-2,4b - dimethyl - 1 - phenanthreneacetic acid by treatment thereof with, for example, oxalyl chloride, to yield the corresponding acid chloride which upon treatment with, for example, dimethyl cadmium gives a compound of Formula VI wherein $n$ is one; hydrogenation of this compound yields compounds of Formula VI wherein $n$ is 0. Alternatively, compounds of Formula VI wherein $n$ is 0 can be prepared by hydrogenating the starting material 2-(carbo-lower alkoxy)-1,2,3,4,4a,4b,5,6,7,8,10, 10a - dodecahydro - 7 - hydroxy - 2,4b - dimethyl-1-phenanthreneacetic acid, converting the so-obtained tetradecahydro compound to the corresponding acid chloride, for example, by treatment with oxalyl chloride, and treating the so-formed acid chloride with dimethyl cadmium giving a compound of Formula VI wherein $n$ is 0.

As indicated above the compounds of Formula I are endrocrinologically active compounds. These compounds are therapeutically useful compounds and, more particularly, are useful as anti-androgens. They are especially useful in that they do not exhibit any significant androgenic or anabolic activity. They are thus useful in treatment of conditions wherein an antiandrogen is indicated, including the treatment undesired conditions brought about by exogenously administered androgens. The compounds of Formula I can be administered internally, for example, parenterally or orally, or topically. Dosages can be adjusted according to individual needs at the professional discretion of the person administering the compound of this invention. Divided dosages can be used. When administered topically, the topical administration form being used such as an ointment, should be used in sufficient amount to cover the area under treatment.

Compounds of Formula I can be administered in the form of conventional pharmaceutical compositions, for example, oral or parenteral administeration forms such as tablets, capsules, dragées, suspensions, emulsions, or the like, and topical administration forms such as ointments, creams, liquids, suspensions, or the like. The compounds of Formula I can be combined according to conventional pharmaceutical practice with standard pharmaceutical carriers or excipients such as lactose, corn starch, talc, magnesium stearate, calcium stearate, vegetable oil, petrolatum, and the like. Compositions containing compounds of Formula I can be subjected to standard pharmaceutical expedients such as sterilization and the like, and can contain other active ingredients.

The following examples are illustrative but not limitative of the invention. All temperatures, unless explicitly indicated otherwise, are stated in degrees centigrade.

EXAMPLE 1

A solution of 25.0 g. of the 2-carbomethoxy1,2,3,4,4a, 4b,5,6,7,8,10,10a-dodecahydro-7-hydroxy-2,4b - 1 - phenanthreneacetic acid in 500 ml. of ethanol was hydrogenated over 5.0 g. of 10% palladium on carbon ($t=24°$, $P=763$ mm.). After the absorption of one mole of hydrogen (about 6 hr.) the rate of hydrogenation had markedly decreased and the reaction was stopped. The catalyst was removed by filtration and the filtrate was evaporated to dryness under reduced pressure to give an oil. Two crystallizations from ethyl acetate gave 2-carbomethoxy-tetradecahydro-7-hydroxy-2,4b-dimethyl-1 - phenanthreneacetic acid which then upon crystallization from aqueous methanol gave the analytical sample, M.P. 180.5–182.5° (vac.).

EXAMPLE 2

To a solution of 11.5 g. of 2-carbomethoxy-tetradecahydro-7-hydroxy-2,4b-dimethyl-1-phenanthreneacetic acid in 120 ml. of dry pyridine was added 60.0 ml. of freshly distilled acetic anhydride and the resulting solution was allowed to stand overnight at room temperature.

The reaction mixture was then slowly treated with 60 ml. of water, the exothermic reaction being maintained at about 50° by external cooling. The resulting solution was then allowed to stand at room temperature for about 30 min. and was then poured into 1 liter of water. The resulting mixture was extracted with ether-methylene chloride (3:1) and the organic layers were washed adding 12.7 g. of cadmium chloride. The cooling bath was then removed and the reaction mixture was allowed to stir at room temperature for 1 hr., whereupon a negative Gilman test was observed. The ether was then removed by distillation and was replaced simultaneously by an equivalent volume of benzene.

To the resulting stirred benzene solution (room temperature) was added, over a 5 min. period, a solution of 10.8 g. of the acid chloride of 2-carbomethoxy1,2,3,4,4a, 4b,5,6,7,8,10,10a-dodecahydro-7-acetoxy-2,4b-dimethyl-1-phenanthreneacetic acid in 135 ml. of benzene. The reaction mixture was then stirred at room temperature for 1 hr. and then heated at 60° for 1 hr. The reaction mixture was permitted to cool to room temperature and then treated with 50 g. of ice and 300 ml. of 1 N hydrochloric acid solution. The organic layer was separated and the aqueous layer was extracted 3 times with ether-methylene chloride (3:1). The organic layers were washed once with 1 N hydrochloric acid solution, once with 1 N sodium hydroxide solution and once with water. The combined organic layers were dried over sodium sulfate and evaporated to dryness giving crude 1-acetonyl-1,2,3,4,4a,4b,5,6,7,8,10-10a-dodecahydro-7-acetoxy-2,4b - dimethyl - 2 - phenanthrenecarboxylic acid methyl ester.

The so-obtained crude material was dissolved in benzene and filtered through a short column of Florisil (Floridin Company, a synthetic magnesium silicate adsorbent), eluting with benzene and finally with ether. The eluates were combined and evaporated to dryness. The residue was crystallized twice from ether-hexane twice with cold 2 N hydrochloric acid solution and once with water. The organic layers were dried over sodium sulfate and were evaporated. The residue was crystallized from ether-hexane giving 2-carbomethoxy-tetradecahydro-7-acetoxy-2,4b - dimethyl-1-phenanthreneacetic acid. One further crystallization from ether-hexane gave the analytical sample, M.P. 134–136.5° (vac.).

EXAMPLE 3

A solution of 60.0 g. of 2-carbomethoxy1,2,3,4,4a,4b,5, 6,7,8,10,10a-dodecahydro-7-acetoxy-2,4b - dimethyl - 1-phenanthreneacetic acid in 1200 ml. of ethyl acetate was hydrogenated over 12.0 g. of 10% palladium on carbon ($t=24°$, $P=761$ mm.). After the absorption of 1 mole of hydrogen (about 24 hr.) the rate of hydrogenation had markedly decreased and the reaction was stopped. The catalyst was removed by filtration and the filtrate was evaporated to dryness. The residue was crystallized twice from ether-hexane giving 2-carbomethoxy-tetradecahydro-7-acetoxy-2,4b-dimethyl-1 - phenanthreneacetic acid, identical in all respects with the sample described in Example 2.

This material was frequently isolated as a polymorphic mixture, M.P. 133–141°, otherwise identical in all respects with the sample described above.

EXAMPLE 4

A solution of methyl magnesium bromide was prepared from 3.26 g. of magnesium and 20 g. of methyl bromide in 300 ml. of ether. To this stirred and cooled (0°) solution was rapidly giving 1-acetonyl-1,2,3,4,4a,4b,5,6,7,8,10, 10a-dodecahydro-7-acetoxy-2,4b-dimethyl - 2 - phenanthrenecarboxylic acid methyl ester which upon crystallization from ethylene chloride-hexane gave the analytical sample, M.P. 109–110°.

EXAMPLE 5

To a stirred solution of 9.0 g. of 2-carbomethoxy-tetradecahydro-7-acetoxy-2,4b-dimethyl-1 - phenanthreneacetic acid in 80 ml. of benzene was added 14 ml. of oxalyl chloride and the resulting solution was heated at 68° for 1.5 hr. An additional 3.3 ml. of oxalyl chloride was then added and heating was continued for 30 min. The solvent was then evaporated under vacuum and the residue was evaporated twice in the presence of benzene to yield the acid chloride of 2-carbomethoxy-tetradecahydro-7-acetoxy-2,4b-dimethyl-1-phenanthreneacetic acid as an oil.

EXAMPLE 6

A solution of methyl magnesium bromide was prepared from 2.9 g. of magnesium and 18 g. of methyl bromide in 180 ml. of ether. To this stirred and cooled (0°) solution was added 90 ml. of ether followed by the rapid addition of 11.3 g. of cadmium chloride. The cooling bath was then removed and the reaction mixture was allowed to stir at room temperature for 30 min., whereupon a negative Gilman test was observed. The ether was then removed by distillation and was replaced simultaneously by an equivalent volume of benzene.

To the resulting cooled solution (room temperature) was added, over a 5 min. period, a solution of 9.8 g. of the acid chloride prepared by the procedure of Example 5 in 120 ml. of benzene. The reaction mixture was then allowed to stir at room temperature for 2 hr. and was then heated at 60° for 45 min. The cooled mixture was then treated with 175 g. of ice followed by 175 ml. of 1 N hydrochloric acid solution. The organic layer was separated and the aqueous layer was extracted with ether-methylene chloride (3:1). The organic layers were washed once with dilute hydrochloric acid, once with dilute sodium hydroxide solution and once with water. The combined organic layers were dried over sodium sulfate and evaporated to dryness. The residue was crystallized twice from ether-hexane giving 1-acetonyl-tetradecahydro-7-acetoxy - 2,4b - dimethyl - 2-phenanthrenecarboxylic acid methyl ester which upon crystallization from ether-hexane gave the analytical sample, M.P. 84.5–86°.

EXAMPLE 7

A solution of 390 mg. of 1-acetoxy-1,2,3,4,4a,4b,5,6,7, 8,10,10a - dodecahydro - 7-acetoxy-2,4b-diethyl-2-phenanthrenecarboxylic acid methyl ester in 8 ml. of ethyl acetate was hydrogenated over 78 mg. of 10% palladium on carbon ($t=26°$, $P=760$ mm.). After the absorption of 30 ml. of hydrogen (theory for 1 mole=24.6 ml.) the rate of hydrogenation had markedly decreased and the reaction was stopped (about 4 hr.). The catalyst was removed by filtration and the filtrate was evaporated to dryness. The residue was crystallized from ether-hexane giving 1-acetonyl tetradecahydro-7-acetoxy-2,4b-dimethyl-2-phenanthrenecarboxylic acid methyl ester, the melting point of which was undepressed upon admixture with the sample prepared by the procedure of Example 6.

EXAMPLE 8

To a solution of 0.932 g. of 1-acetonyl-tetradecahydro-7 - acetoxy-2,4b-dimethyl-2-phenanthrenecarboxylic acid methyl ester in 7.5 ml. of methylene chloride was added 1.0 g. of anhydrous disodium hydrogen phosphate. To this stirred mixture was added over a 5 min. period a solution containing 0.32 ml. of 90% hydrogen peroxide and 1.5 ml. of trifluoroacetic anhydride in 10 ml. of methylene chloride. The reaction mixture warmed noticeably and was then stirred at room temperature for 2.5 hr. It was then decomposed with ice and water, and the resultant mixture was extracted with ether-methylene chloride (3:1). The organic layers were washed twice with dilute sodium bicarbonate solution and once with brine. The combined organic layers were dried over sodium sulfate and evaporated to dryness to give an oil which was dissolved in benzene and filtered through a short column of silicic acid. The benzene and ethyl acetate eluates were evaporated to give an oil which did not crystallize.

To a solution of the so-obtained oily material in 4.0 ml. of methanol was added a solution of 0.4 g. of potassium hydroxide in 0.4 ml. of water and the resulting solution was heated under reflux for 90 min. The solvents were then removed under vacuum and the residue was diluted with 15 ml. of water. The aqueous solution was washed with ether and was then acidified to Congo red with 3 N hydrochloric acid. The resulting precipitate was filtered, washed with water and dried. Crystallization from methanol-acetonitrile gave tetradecahydro-7-hydroxy-1-hydroxy - methyl - 2,4b-dimethyl-2-phenanthrenecarboxylic acid which upon one further crystallization from the same solvent system gave the analytical sample, M.P. 184.5–189° (vac.).

EXAMPLE 9

A solution of 50 mg. of tetradecahydro-7-hydroxy-1-hydroxy - methyl-2,4b-dimethyl-2-phenanthrenecarboxylic acid in 2.5 ml. of freshly distilled acetic anhydride was heated under reflux for 2 hr. The reaction mixture was then evaporated to dryness and the residue was dissolved in ether and filtered through a short column of synthetic magnesia-silica gel (Florisil). The eluates were evaporated to dryess and the residue was crystallized from ether-hexane giving 3β-acetoxy-16-oxa-5α-androstan-17-one, M.P. 172.5–175°. The sample was identical with the product obtained by the procedure of Example 10 in which the intermediate tetradecahydro-7-hydroxy-1-hydroxymethyl-2,4b-dimethyl-2-phenanthrenecarboxylic acid was not isolated.

EXAMPLE 10

2.11 g. of 1-acetonyl-tetradecahydro-7-acetoxy-2,4b-dimethyl-2-phenanthrenecarboxylic acid methyl ester was oxidized with peroxytrifluoroacetic acid as described in Example 8 giving crude product which was hydrolyzed directly with alcoholic potassium hydroxide giving crude tetradecahydro - 7 - hydroxy - 1 - hydroxymethyl-2,4b-dimethyl-2-phenanthrenecarboxylic acid. The latter material was lactonized directly with acetic anhydride. The crude product was filtered with ether through synthetic magnesia-silica gel (Florisil) and the resulting material was crystallized three times from ether-hexane giving 3β-acetoxy-16-oxa-5α-androstan-17-one which upon one further crystallization gave the analytical sample, M.P. 173–174.5° (vac.).

EXAMPLE 11

To a solution of 142 g. of 2-carbomethoxy-tetradecahydro-7-acetoxy-2,4b-dimethyl-1-phenanthreneacetic acid in 1440 ml. of ethanol was added about 3650 ml. of 1 N sodium hydroxide solution until the solution just gave a pink coloration with phenolphthalein, whereupon the reaction mixture was immediately acidified with a few drops of dilute nitric acid solution. The stirred solution was then diuted with an additional 1440 ml. of water, followed by the addition of a solution of 85.4 g. of silver nitrate in 1440 ml. of water. The resulting voluminous precipitate was filtered, washed well with water and dried overnight in a vacuum oven at 80° giving the silver salt of 2 - carbomethoxy - tetradecahydro - 7-acetoxy-2,4b-dimethyl-1-phenanthreneacetic acid.

To a vigorously stirred suspension of the so-formed silver salt (173 g.) in 1730 ml. of dry carbon tetrachloride was added dropwise, over a 10 min. period, a solution of 54.5 g. of bromine in 540 ml. of dry carbon tetrachloride. The yellow reaction mixture was then heated under a reflux for 80 min. The reaction mixture was then permitted to cool to room temperature and filtered through a bed of Celite (Johns-Manville Company, a diatomaceous silica product) and about 90% of the solvent was removed under vacuum. The residue was diluted with 1400 ml. of ether and the organic layer was washed with 10% sodium carbonate solution and water. The combined organic layers were dried over sodium sulfate and evaporated to dryness giving crude 1-bromomethyl-2-carbomethoxy - tetradecahydro - 7 - acetoxy-2,4b-dimethylphenanthrene.

A solution of 107 g. of the so-obtained crude bromide and 214 g. of anhydrous potassium acetate in 1 liter of dimethyl sulfoxide was heated on the steam bath for 4 hr. The reaction mixture was permitted to cool and then poured into 3 liters of water and the resulting mixture was extracted 3 times with ethermethylene chloride (3:1). The organic layers were washed 4 times with water. The combined organic layers were dried over sodium sulfate and evaporated. The resulting oil was dissolved in benzene and filtered through a short column of Florisil. The benzene (1.5 l.) and ethyl acetate (500 ml.) eluates were evaporated to dryness giving crude 1-acetoxymethyl-2-carbomethoxy-tetradecahydro - 7 - acetoxy-2,4b-dimethylphenanthrene as a yellow oil.

A solution of the so-obtained crude diacetate (102 g.) in 1 liter of methanol was heated under reflux for 2 hr. with a solution of 102 g. of potassium hydroxide in 102 ml. of water. The cooled reaction mixture was then concentrated to near dryness under vacuum. The residue was then dissolved in 4 liters of water and the aqueous solution was washed twice with ether. The aqueous layer was acidified to Congo red with 6 N hydrochloric acid. The resulting mixture (precipitate) was diluted with an equal volume of methanol and was heated under reflux for 30 min. Most of the methanol was then removed under vacuum and the reside was diluted with 1500 ml. of water. The resulting mixture was extracted 3 times with ethermethylene chloride (3:1) and the organic layers were washed once with 5% sodium bicarbonate solution and once with water. The combined organic layers were dried over sodium sulfate and evaporated to dryness. The residue was dissolved in 200 ml. of methylene chloride and filtered through a short column of Florisil. The eluates were concentrated to dryness and the residue was crystallized from ethyl acetate giving 3$\beta$-hydroxy-16-oxa-5$\alpha$-androstan-17-one which upon crystallization from ethyl acetate gave the analytical sample, M.P. 182.5–184° (vac.).

EXAMPLE 12

To a stirred solution of 20.0 g. of 3$\beta$-hydroxy-16-oxa-5$\alpha$-androstan-17-one in 300 ml. of acetone was added dropwise 28 ml. of chromic acid solution. After the addition was finished, the reaction was stirred at room temperature for an additional 5 min. The excess chromic acid was then decomposed by the addition of 1 ml. of isopropanol. The reaction mixture was then poured into 1.5 liters of water and the resulting mixture was extracted with ether-methylene chloride (3:1). The organic layers were washed once with water and once with 5% sodium bicarbonate solution. The combined organic layers were dried over sodium sulfate and evaporated. The residue was crystallized from ether-hexane giving 16-oxa-5$\alpha$-androstane-3,17-dione which upon crystallization from methylene chloride-ether gave the analytical sample, M.P. 188–189.5° (vac.).

EXAMPLE 13

A solution of 10.0 g. of 16-oxa-5$\alpha$-androstane-3,17-dione, 550 mg. of p-toluenesulfonic acid and 55 ml. of ethylene glycol in 330 ml. of benzene was slowly distilled over a period of 2.5 hr. An additional 15 ml. of ethylene glycol, 0.1 g. of p-toluenesulfonic acid and 150 ml. of benzene was then added and slow distillation was carried out for an additional 2.5 hr. The cooled reaction mixture was then diluted with ether and the organic layer was washed twice with 5% sodium bicarbonate solution and once with water. The organic layer was dried over sodium sulfate, concentrated and the residue was crystallized from methylene chloride-ether-hexane giving 3-(cyclic ethylene acetal) of 16-oxa-5$\alpha$-androstane - 3,17-dione which upon crystallization from ether-hexane gave the analytical sample, M.P. 193.5–195° (vac.).

EXAMPLE 14

A solution of disiamylborane was prepared by adding a solution of 15.0 g. of 2-methyl-2-butene in 40 ml. of dry tetrahydofuran to 100 ml. of cold (0°) 1 M borane solution (tetrahydrofuran). The resulting solution was then allowed to stand for 1 hr. at room temperature, and a portion was then used immediately for the following reaction.

To a stirred solution of 8.0 g. of 3-(cyclic ethylene acetal) of 16-oxa-5$\alpha$-androstane-3,17-dione in 80 ml. of dry tetrahydrofuran was added, at room temperature and over a 30 min. period, 100 ml. of the above-prepared disiamylborane solution and the resulting mixture was allowed to stir at room temperature for 2 hr. The reaction mixture was then treated with 10 ml. of saturated sodium sulfate solution and the precipitated inorganic salts were removed by filtration. The filtrate was evaporated to near dryness and the residue was diluted with 300 ml. of ethermethylene chloride (3:1). The organic layer was washed with saturated sodium chloride solution and then with water. The organic solution was dried over sodium sulfate and concentrated to dryness to afford a colorless oil which was dissolved in benzene and chromatographed on a column (400 g.) of silicic acid (400 ml. fractions). The fractions eluted with 30% ethyl acetate-benzene and then pure ethyl acetate were concentrated and dissolved in benzene and chromatographed again using a 250 g. column of silicic acid (250 ml. fractions). The fractions eluted with 40% ethyl acetate-benzene, followed by pure ethyl acetate, were combined and concentrated. The residue was crystallized once from ether-hexane and then from methylene chloride-ether giving cyclic ethylene acetal of 17$\xi$-hydroxy-16-oxa-5$\alpha$-androstan-3-one which upon crystallization from ether-hexane gave the analytical sample, M.P. 167–169° (vac.).

EXAMPLE 15

A solution of 2.25 g. of cyclic ethylene acetal of 17$\xi$-hydroxy - 16 - oxa-5$\alpha$-androstan-3-one in 225 ml. of tetrahydrofuran and 50 ml. of 3 N hydrochloric acid was allowed to stand at room temperature for 3 days. Most of the solvent was then removed under vacuum and the residue was diluted with 250 ml. of water. The resulting mixture was extracted with ethermethylene chloride (3:1) and the organic layers were washed with water, dried over sodium sulfate and evaporated. The residue was dissolved in benzene and filtered through a short column (20 g.) of silicic acid. The fractions eluted with 20% ethyl acetate-benzene and pure ethyl acetate were combined and evaporated. The residue was crystallized twice from methylene chloride-ether-hexane giving crude 17$\xi$-hydroxy-16-oxa-5$\alpha$-androstan-3-one which was crystallized once from acetonitrile giving 17$\xi$-hydroxy-16-oxa-5$\alpha$-androstan-3-one, M.P. 161.5–163° dec. (vac.).

EXAMPLE 16

To a stirred and cooled (−60°) solution of 1.0 g. of 1 - acetonyl-1,2,3,4,4a,4b,5,6,7,8,10,10a-dodecahydro-7-acetoxy-2,4b-dimethyl-2 - phenanthrenecarboxylic acid methyl ester in 40 ml. of chloroform was added dropwise a solution of 0.43 g. of bromine in 10.4 ml. of carbon tetrachloride. The cooling bath was then removed and the reaction mixture was allowed to warm to room temperature for 15 min.

The reaction mixture was then diluted with 40 ml. of 5% sodium bicarbonate solution, followed by the addition of 200 ml. of ether. The organic phase was washed with 5% sodium bicarbonate solution and water. The organic layer was dried over sodium sulfate, and evaporated to dryness under reduced pressure to afford the crude 1-acetonyl - 8a,9 - dibromo - 7 - acetoxy-2,4b-dimethyl-perhydro-2-phenanthrenecarboxylic acid methyl ester as a pale yellow oil.

To a solution of 1.4 g. of the above crude dibromide in 20 ml. of methylene chloride was added 2.5 g. of anhydrous disodium hydrogen phosphate. To this stirred mixture was added, over a 10 min. period, a solution containing 0.82 ml. of 90% hydrogen peroxide and 3.85 ml. of trifluoroacetic anhydride in 25 ml. of methylene chloride. The reaction mixture was then allowed to stir at room temperature for 3.75 hr., after which it was decomposed with ice and water. The resultant mixture was extracted with ether-methylene chloride (3:1). The organic extract was washed twice with 5% sodium bicarbonate solution and once with brine. The organic solution was dried over sodium sulfate and concentrated to dryness to yield a colorless oil.

To a solution of 1.45 g. of the so-obtained colorless oil in 20 ml. of glacial acetic acid was added, over a 10 min. period, 4.0 g. of zinc dust. The so-formed reaction mixture was heated at 65° for 30 min. and then filtered from the precipitate. The filtrate was diluted with 50 ml. of water and was then extracted with ether-methylene chloride (3:1). The organic layer was washed with 5% sodium bicarbonate solution, water, and was then dried over sodium sulfate and concentrated under reduced pressure to afford an oil.

To a solution of 1.02 g. of the so-obtained oil in 10 ml. of methanol was added a solution of 1.0 g. of potassium hydroxide in 1.0 ml. of water. The reaction mixture was heated under reflux for 90 min. and was then cooled and most of the solvents were removed under reduced pressure. The residue was diluted with 40 ml. of water and was extracted with ether-methylene chloride (3:1). The aqueous layer was filtered and was then acidified to Congo red with dilute hydrochloric acid. The resulting precipitate was filtered, dried, and was then crystallized from methanol acetonitrile giving 1,2,3,4,4a,4b,5,6,7,8,10,10a-dodecahydro-7-hydroxy-1-hydroxymethyl - 2,4b-dimethyl-2-phenanthrenecarboxylic acid methyl ester, M.P. 196–198° (vac.).

EXAMPLE 17

A solution of 125 mg. of 1,2,3,4,4a,4b,5,6,7,8,10,10a-dodecahydro - 7 - hydroxy - 1 - hydroxymethyl-2,4b-dimethyl-2-phenanthrenecarboxylic acid methyl ester in 5 ml. of methanol and 0.5 ml. of 3 N hydrochloric acid was heated under reflux for 1 hr. The reaction mixture was then cooled and most of the solvents were removed under reduced pressure. The residue was diluted with 15 ml. of water and was extracted with ether-methylene chloride (3:1). The organic layer was washed with water, dried over sodium sulfate and evaporated. The residue was dissolved in ethyl acetate and was filtered through a short column of synthetic magnesia-silica gel (Florisil). The eluates were evaporated to dryness and the residue was crystallized from methylene chloride-ether giving 3β-hydroxy-16-oxa-5 - androsten - 17 - one, M.P. 200–201° (vac.).

EXAMPLE 18

A stirred solution of 1.0 g. of 3β-hydroxy-16-oxa-5-androsten-17-one in 15 ml. of acetone was treated dropwise with 1.5 ml. of standard chromium trioxide reagent (26.72 g. of chromium trioxide in 23 ml. of concentrated sulfuric acid diluted with water to a volume of 100 cc.). After the addition was finished, the reaction mixture was stirred at room temperature for an additional 5 min. The excess reagent was then decomposed by the addition of a few drops of isopropanol. The reaction mixture was then diluted with 100 ml. of water, extracted with ether-methylene chloride (3:1), and the extracts were washed with 5% sodium bicarbonate solution and water, dried over sodium sulfate and concentrated to dryness. The residue was re-dissolved in 20 ml. of methanol and heated to reflux, 0.2 ml. of 6 N sulfuric acid was added, and the mixture was heated under reflux for 3 min., diluted with water and extracted with ether-methylene chloride. The organic phase was washed with water, dried over sodium sulfate and concentrated. The residue was purified by chromatography on silica gel followed by crystallization from ether-hexane giving 16-oxa-4-androstene-3,17-dione.

EXAMPLE 19

A solution of 1.0 g. of 16-oxa-4-androstene-3,17-dione, 55 mg. of p-toluenesulfonic acid and 5.5 ml. of ethylene glycol in 33 ml. of benzene was distilled slowly over a period of 2.5 hr. An additional 1.5 ml. of ethylene glycol, 10 mg. of p-toluenesulfonic acid and 15 ml. of benzene was then added and slow distillation was carried out for an additional 2.5 hr. The cooled reaction mixture was diluted with ether and the organic solution was washed twice with 5% sodium bicarbonate solution, and once with water. The organic solution was dried over sodium sulfate, was concentrated and the residue was crystallized from ether-hexane giving 3-(cyclic ethylene acetal) of 16-oxa-4-androstene-3,17-dione.

EXAMPLE 20

To a solution of 1 g. of 3-(cyclic ethylene acetal) of 16-oxa-4-androstene-3,17-dione in 50 ml. of toluene, cooled to −70°, was added 3.3 ml. of 1 M diisobutylaluminum hydride in toluene. The reaction mixture was allowed to stir for about 1 hr., and was then decomposed by the addition of 50 ml. of water and 50 cc. of 10% acetic acid. The organic layer was separated, washed with water, 5% sodium bicarbonate solution, and was then dried over sodium sulfate and concentrated to dryness. The residue was chromatographed on a column of silicic acid. The fractions eluted with benzene-ethyl acetate were concentrated to dryness in the residue was crystallized from methylene chloride-ether-hexane giving the cyclic ethylene acetal of 17ξ-hydroxy-16-oxa-4-androsten-3-one.

EXAMPLE 21

A solution of 1 g. of cyclic ethylene acetal of 17ξ-hydroxy-16-oxa-4-androsten-3-one in 100 ml. of tetrahydrofuran and 22 ml. of 3 N hydrochloric acid was allowed to stand at room temperature overnight. Most of the solvent was then removed under vacuum and the residue was diluted with 100 ml. of water. The resulting mixture was extracted with ether-methylene chloride (3:1) and the organic layers were washed with water, dried over sodium sulfate and evaporated. The residue was dissolved in benzene and filtered through a short column of silicic acid. The fractions eluted with 20% ethyl acetate-benzene and pure ethyl acetate were combined and evaporated. The residue was crystallized from methylene chloride-ether-hexane giving 17ξ-hydroxy-16-oxa-4-androsten-3-one.

EXAMPLE 22

Tablets containing 1.0 mg. each of 17ξ-hydroxy-16-oxa-5α-androstan-3-one as the active ingredient were prepared according to the following formulation:

| | Per tablet, mg. |
|---|---|
| 17ξ-hydroxy-16-oxa-5α-androstan-3-one | 1.0 |
| Lactose, spray dried | 95.0 |
| Corn starch, U.S.P. | 3.0 |
| Calcium stearate | 1.0 |
| Total weight | 100.0 |

The tablets were prepared by first blending in a suitable mixer the active ingredient, lactose, corn starch and calcium stearate. The so-obtained powder was compressed on a heavy duty machine and yielded tablet slugs of about 1″ diameter and ¼″ thickness. These tablet slugs were then passed through a suitable comminuting machine yielding granules of approximately 16 mesh with a minimum of fines. The granulation was then recompressed on a tablet compressing machine using a ¼″ standard concave punch to a tablet weight of 100 mg.

EXAMPLE 23

Capsules containing 0.5 mg. each of 17ξ-hydroxy-16-oxa-5α-androstan-3-one as the active ingredient were prepared according to the following formulation:

| | Per capsule, mg. |
|---|---|
| 17ξ-hydroxy-16-oxa-5α-androstan-3-one | 0.5 |
| Lactose | 180.0 |
| Corn starch | 39.5 |
| Talc | 5.0 |
| Total weight | 225.0 |

The capsules were prepared by first mixing the active ingredient with the lactose and corn starch in a suitable mixer. The mixture was further blended by passing through a suitable comminuting machine such as a Fitzpatrick Comminuting Machine with a No. 1A screen with knives forward. The so-obtained blended powder was returned to the mixer, the talc added thereto and the resulting mixture blended thoroughly. It was then filled into No. 4 hard shell gelatin capsules on a capsulating machine such as the Parke Davis capsulating machine.

EXAMPLE 24

An ointment formulation containing 0.1% by weight of 17ξ-hydroxy-16-oxa-5α-androstan-3-one as the active ingredient was prepared according to the following formulation:

| | Per kilo, gms. |
|---|---|
| White petrolatum, U.S.P. | 999 |
| 17ξ-hydroxy-16-oxa-5α-androstan-3-one | 1 |

The ointment was prepared by first placing the white petrolatum U.S.P. in a suitable jacketed mixing kettle and heated to approximately 85° with slow agitation. The active ingredient, which had been ground to a fine powder in a small ball mill, was then added to the petrolatum and the mixture stirred until thoroughly mixed. Cool water was then circulated through the jacketed kettle and the cooling was continued until the temperature reached about 36°. The mixture was then passed into a colloid mill such as an Eppenbach colloid mill at a setting of 20 microns. The so-obtained ointment preparation was then packaged in opal glass jars, as well as in aluminum or tin ointment tubes.

What is claimed is:
1. A compound of the formula:

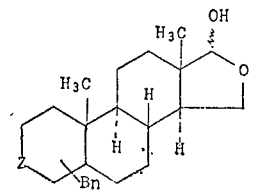

wherein B is an olefinic unsaturation between carbon atoms 4 and 5, $n$ is a whole integer from 0–1 and Z is a hydrolyzable ketal protected carbonyl.

References Cited

UNITED STATES PATENTS 3,312,717   4/1967   Baran _____ 260—346.2 X
3,483,226   12/1969  Baran _____ 260—346.2 X

OTHER REFERENCES

Brown et al., "J.A.C.S.," vol. 83 (1961), pp. 486–7 (I).
Brown et al., "J.A.C.S.," vol. 82 (1960), pp. 3222–3 (II).
Quinkert et al., "Tetrahedron Letters," vol. 38 (1966), pp. 4573–78.
Kierstead et al., "Journ. Org. Chem.," vol. 32 (1967), pp. 704–8.

ALEX MAZEL, Primary Examiner
J. H. TURNIPSEED, Assistant Examiner

U.S. Cl. X.R.

260—338, 340.7, 343.3, 346.2, 488, 514; 424—285